US011776035B2

(12) United States Patent
Gulati et al.

(10) Patent No.: US 11,776,035 B2
(45) Date of Patent: Oct. 3, 2023

(54) TRANSACTION AND RECEIPT BASED ALERT AND NOTIFICATION SYSTEM AND TECHNIQUES

(71) Applicant: Capital One Services, LLC, McLean, VA (US)

(72) Inventors: Latika Gulati, Annandale, VA (US); Joshua Edwards, Philadelphia, PA (US); Lukiih Cuan, Washington, DC (US)

(73) Assignee: Capital One Services, LLC

( * ) Notice: Subject to any disclaimer, the term of this patent is extended or adjusted under 35 U.S.C. 154(b) by 258 days.

(21) Appl. No.: 16/868,131

(22) Filed: May 6, 2020

(65) Prior Publication Data

US 2021/0350437 A1 Nov. 11, 2021

(51) Int. Cl.
*G06Q 30/0601* (2023.01)
*G06Q 30/0251* (2023.01)
(Continued)

(52) U.S. Cl.
CPC .......... *G06Q 30/0623* (2013.01); *G06N 5/04* (2013.01); *G06N 20/00* (2019.01); *G06Q 10/087* (2013.01);
(Continued)

(58) Field of Classification Search
CPC ............. G06Q 30/0623; G06Q 10/087; G06Q 20/108; G06Q 20/3263; G06Q 30/0205; G06Q 30/0206; G06Q 20/04; G06Q 30/0255; G06Q 30/0605; G06Q 30/0631; G06N 5/04; G06N 20/00; G06V 30/10; G06V 30/41
(Continued)

(56) References Cited

U.S. PATENT DOCUMENTS 5,774,868 A 6/1998 Cragun et al.
9,230,132 B2 1/2016 Gkoulalas-Divanis et al.
(Continued)

OTHER PUBLICATIONS

Where Launches Deal Alerts—First Ever Service to Push Coupons and Discounts to Consumers Based on Preference and Location. Business Wire. Jun. 21, 2010: NA.*
(Continued)

*Primary Examiner* — Timothy Padot
(74) *Attorney, Agent, or Firm* — KDW Firm PLLC

(57) ABSTRACT

Examples are described that enable a sales notification application executing on the mobile device to provide an indication of a better price for a product. In the examples, product information may be obtained from product purchase receipts uploaded by mobile devices executing an instance of a sales notification application. Similarities may be determined between the product information received from each product purchase of the plurality of product purchases. The product information from each of the uploaded receipts may be aggregated based on the determined similarity between the product information. A selected product and a location at which the selected product has been purchased previously may be received for comparison to the aggregated information in a product purchase database. A comparison result may be output to the sales notification application. A payment card may be enabled to purchase the selected product.

19 Claims, 9 Drawing Sheets

(51) Int. Cl.
*G06Q 30/0204* (2023.01)
*G06N 20/00* (2019.01)
*G06N 5/04* (2023.01)
*G06Q 20/10* (2012.01)
*G06Q 20/32* (2012.01)
*G06Q 10/087* (2023.01)
*G06Q 30/0201* (2023.01)
*G06V 30/41* (2022.01)
*G06V 30/10* (2022.01)

(52) U.S. Cl.
CPC ....... *G06Q 20/108* (2013.01); *G06Q 20/3263* (2020.05); *G06Q 30/0205* (2013.01); *G06Q 30/0206* (2013.01); *G06Q 30/0255* (2013.01); *G06Q 30/0605* (2013.01); *G06Q 30/0631* (2013.01); *G06V 30/10* (2022.01); *G06V 30/41* (2022.01)

(58) Field of Classification Search
USPC ........................................................ 705/7.35
See application file for complete search history.

(56) References Cited

U.S. PATENT DOCUMENTS

| | | | |
|---|---|---|---|
| 10,192,217 | B1 | 1/2019 | Ellis et al. |
| 2004/0024769 | A1* | 2/2004 | Forman ................. G06F 16/353 |
| 2008/0301006 | A1* | 12/2008 | Holly .................... G06Q 30/02 |
| | | | 705/26.62 |
| 2010/0121775 | A1* | 5/2010 | Keener, Jr. ............. G06Q 30/02 |
| | | | 705/347 |
| 2010/0306080 | A1* | 12/2010 | Trandal .................. G06Q 10/10 |
| | | | 705/26.8 |
| 2011/0191184 | A1 | 8/2011 | Blackhurst et al. |
| 2012/0226570 | A1* | 9/2012 | Kemp .................... G06Q 50/14 |
| | | | 705/26.1 |
| 2014/0019317 | A1* | 1/2014 | Casares ................. G06Q 40/12 |
| | | | 705/30 |
| 2014/0046794 | A1* | 2/2014 | Vallery ............... G06Q 30/0631 |
| | | | 705/26.7 |
| 2014/0195396 | A1* | 7/2014 | Bhakta .................. G06Q 40/02 |
| | | | 705/35 |
| 2014/0304059 | A1* | 10/2014 | Wang ................. G06Q 30/0234 |
| | | | 705/14.34 |
| 2015/0161704 | A1* | 6/2015 | Lempel ............. G06Q 30/0639 |
| | | | 705/26.64 |
| 2015/0220951 | A1 | 8/2015 | Kurapati et al. |
| 2016/0217509 | A1* | 7/2016 | Eggleston, IV ... G06Q 30/0283 |
| 2018/0150869 | A1* | 5/2018 | Finnegan ........... G06Q 30/0239 |
| 2018/0189786 | A1* | 7/2018 | Poole .................... G06V 30/142 |

OTHER PUBLICATIONS

Pricerazzi launches in the U.S. to help customers claim millions in price match savings: Canadian-based app ensures customers pay the lowest price on everything they buy. PR Newswire [New York] Apr. 26, 2016.*

Author Unknown, "GasBuddy", GasBudy.com [online], Retrieved from Internet URL: <https://www.gasbuddy.com/>, 8 pages. Retrieved on May 5, 2020.

* cited by examiner

TRANSACTION AND RECEIPT BASED ALERT AND NOTIFICATION SYSTEM AND TECHNIQUES

BACKGROUND

A large amount of information is collected by entities, such as merchants and financial institutions during and after a payment card transaction. For example, the merchant may have an inventory system that is decremented by the number of products sold during the transaction and financial institution may deduct a cost of the product from an account balance or from a credit limit and may post the transaction to a user's account. However, the user gains little from the collection of this information.

For example, the user does not gain any information regarding the merchant's inventory or when the merchant may announce a discount sale on the product just purchased. In addition, the user does not know what other people are paying at other merchants for the same product.

It would be beneficial and advantageous if techniques and a system were available that enabled a consumer to realize a savings from the collected data.

SUMMARY

Disclosed is a method that includes receiving from a sales notification application executing on a mobile device a product notification request for a notification related to a product identified in the product notification request. A database including product information data parsed from a number of receipts from a number users may be accessed. Product information data related to the product in the product notification request may be obtained over a period of time from the database. The product information data may include a product price information, product details, product purchase location information, a category of the product, or a merchant name. Based on the obtained product information data, market information indicating a change in the product information data related to the product in the product notification request may be determined at the end of the period of time. A product notification including the market information may be sent to the sales notification application executing on the mobile device. A payment card associated with the sales notification application executing on a mobile device may be enabled for purchase of a product included in the product notification.

An example of an apparatus that includes a memory, a processor, a touchscreen display and a sales notification application is provided. The touchscreen display may be operable to receive inputs and present a graphical user interface generated by the processor. The sales notification application may include programming code stored in the memory. The sales notification application when executed by the processor may be operable to establish a linkage to a payment account and a payment card associated with the payment account. An image of a receipt of a product purchase transaction may be sent to an image recognition service. Recognized text of the image of the receipt receive may be received from the image recognition service. A list of products included on the receipt of the product purchase transaction may be obtained from the recognized text. The list of products obtained from the recognized text may be presented in the graphical user interface presented on the touchscreen display. An indication of a product selected from the list of products presented in the graphical user interface may be received via an input to the graphical user interface presented on the touchscreen display. Product information related to the selected product may be provided to a best deal service. The product information related to the selected product may include a portion of the recognized text from the receipt related to a product price, a location of a sale of the selected product, and a quantity of the product involved in the sale of the selected product. A product notification containing deal information related to the selected product may be received from the best deal service. The deal information may include an indication of al lower price than in the image of the receipt. A payment card associated with the sales notification application executing on the processor may be enabled for purchase of the selected product included in the received product notification.

A system is provided that includes a server and a mobile device. The server may include a server processor, a communication interface, and programming code. The communication interface may be coupled to the server processor and be operable to communicate with external devices. The programming code may be operable when executed by the server processor to interact with a best deal service and an image recognition service. The mobile device may include a transceiver, a processor, a display device, a memory and a sales notification application. The transceiver may be operable to wirelessly communicate with external devices including the communication interface. The display device may be controlled by the processor. The sales notification application including programming code may be stored in the memory. The sales notification application when executed by the processor may be operable to obtain an image of a receipt of a product purchase transaction. Recognized text of the image of the receipt may be received from an image recognition service. A list of products including product information may be obtained from the recognized text. In a graphical user interface of the mobile device, the list of products including the product information may be presented. An indication of a selected product from the list of products presented in the graphical user interface may be received via the graphical user interface. Product information related to the selected product may be provided to a best deal service. The product information may include a portion of the recognized text from the receipt related to a price of the selected product, a location of a sale of the selected product, and a quantity of the selected product involved in the sale of the selected product. A product notification containing deal information related to the selected product may be received from the best deal service. The deal information may include an indication of a lower price than in the image of the receipt. A payment card associated with the sales notification application executing on the mobile device may be enabled for purchase of the selected product based on the deal information included in the product notification.

DETAILED DESCRIPTION

Figure 1:
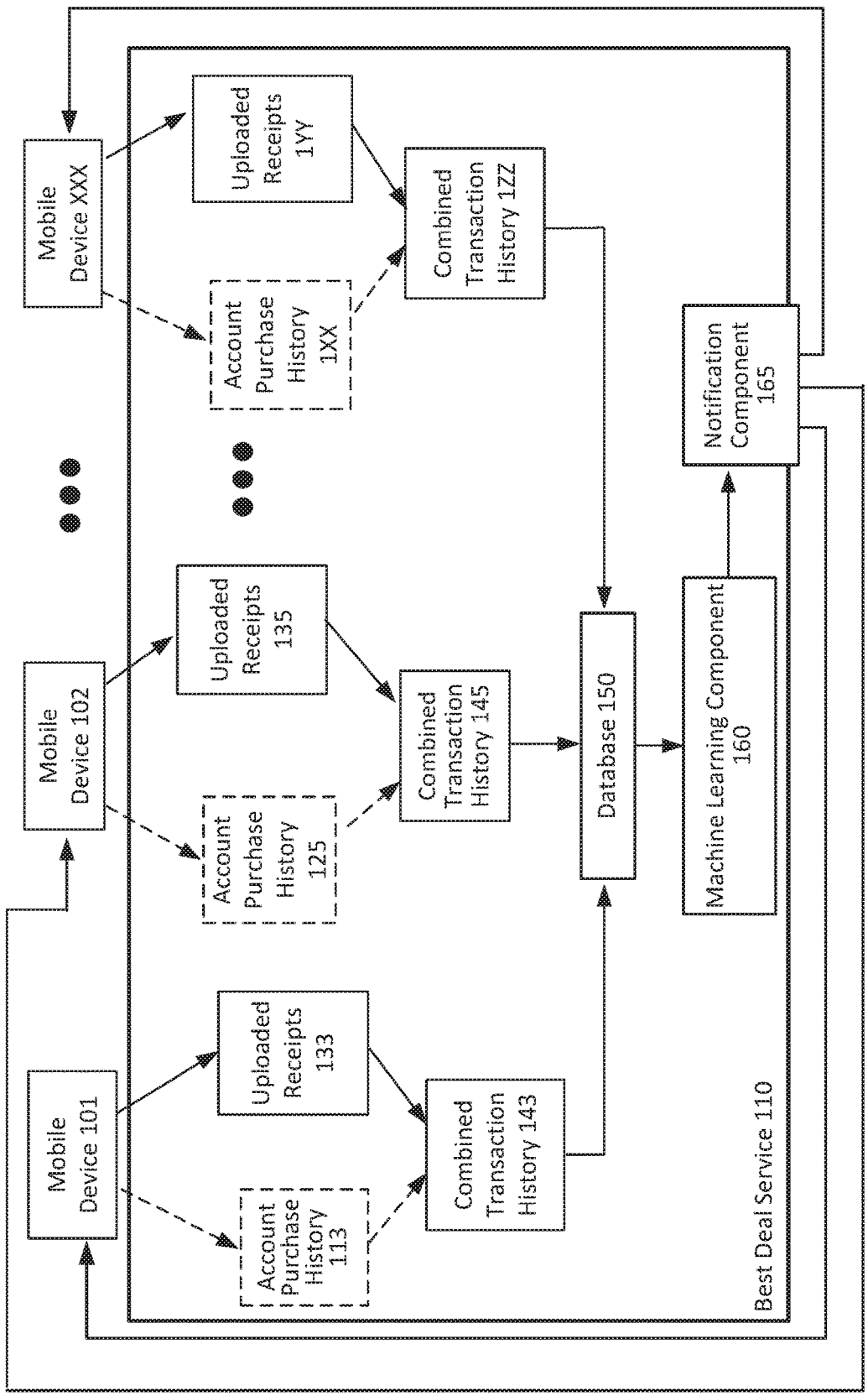
FIG. 1 shows an example of a service with system components suitable for implementing the examples of techniques and processes described herein.

In the following description, examples will be described with reference to the accompanying drawings. FIG. 1 shows an example of a service operable to implement the example techniques and processes described herein. The service may be referred to as a best deal service 110, that is operable to provide a user with a notification that identifies a merchant offering the product at a "better deal" than the deal that the user had received when previously purchasing the product. In the context of this application, the "deal" is a purchase transaction that includes information that form the basis for quantifying the deal as a good deal, better deal or best deal, such as a less expensive offering of the product is considered a better deal. The less expensive offering may be in the context of a price per product (or price per unit), so a volume discount may be included in the presentation of the better deal. The information may include the product identification information, the price information of the product, the merchant name, product quantity information, and the like. Using this information obtained from multiple subscribers, the best deal service 110 may determine whether one purchase transaction is "better" than another for various reasons. For example, the mobile device 101 may enable the purchase a product that cost $5 for 1 of the product (i.e., the quantity is 1) at a first merchant at a corner store in a downtown metropolitan area. Meanwhile, the mobile device 102 may enable the purchase of the same product but in the quantity of 2 for $7 at a second merchant that is in a strip mall a short distance from the corner store in the downtown metropolitan area where the $5 product was purchased. The best deal service 110 may evaluate the two purchase transactions to determine which is "better." Using price to determine which is the better deal, the best deal service 110 may recommend that the second transaction of the product, which has an individual price of $3.50 per product (i.e., $7/2=$3.50) is the better deal.

At least one advantage of the described best deal service, sales notification application and systems that implement the described examples is that by aggregating information from participants in the best deal service and users of the sales notification application is the efficient collection of data from a variety of disparate sources. For example, product information data is not only provided by merchants or brands announcing sales of products or services or affiliated financial institutions, but also actual purchasers providing substantially real-time data that enables the best deal service to provide up-to-date and timely market information for products selected by the participants and the users of the best deal service, sales notification application and systems that implement the described examples.

In the example of FIG. 1, the best deal service 110 may be operable to communicate with mobile devices 101, 102 to mobile device XXX. For example, each of the respective mobile devices 101, 102 to XXX may be executing an instance of a sales notification application (shown in the example of FIG. 2) that is operable to establish a communication link with the best deal service 110. Using the mobile device 101 as the primary device in the example of FIG. 1, the mobile device 101 may be operable to upload receipts from purchases to the best deal service 110. The uploaded receipts may be email receipts, text message receipts or images of receipts (such as paper receipts). In addition, images of the email receipts and text message receipts may be collected as screen shots on the mobile device 101 and uploaded to the best deal service 110. The images of receipts may include image data, such as Red-Green-Blue pixel data, luminance data, other color system data, brightness data, and the like. Information obtained from the uploaded receipts 133 may be stored, either permanently or temporarily, by the best deal service 110 in the combined transaction history 143. For example, as prices of products change, or a product reaches an end of its lifecycle (e.g., Coke Zero® or the like), it may be unnecessary to store receipts from prior years in the combined transaction history 143. The mobile device 101 may be associated with a bank account or credit account through which purchases may be completed (e.g., a payment card may be associated with the bank account or the credit account). Depending upon settings in the sales notification application, for example, product purchase transactions posted to the bank account or credit account may be shared with the best deal service 110. In an example, the account purchase history 113 may include product purchase transactions made using a payment card associated with the bank account or the credit account. The account purchase history 113 may include monthly, weekly or daily transactions. The best deal service 110 may process information obtained from the account purchase history 113 and the uploaded receipts 133 in the combined transaction history 143. Similarly, each of the mobile devices 102 to XXX may perform similar actions. For example, the mobile device 102 may upload receipts to the best deal service 110 that are stored as uploaded receipts 135 and, if the mobile device 102 has an association with a bank account or a credit account and opts to share product purchase transactions with the best deal service 110, account purchase history 125 may be populated with product purchase transactions completed by the mobile device 102. The best deal service 110 may process information obtained from the account purchase history 125 and the uploaded receipts 135 in the combined transaction history 145. Similarly, the mobile device XXX may upload receipts to the best deal service 110 that are stored as uploaded receipts 1YY and, if the mobile device XXX has an association with a bank account or a credit account and opts to share product purchase transactions with the best deal service 110, account purchase history 1XX may be populated with product purchase transactions completed by the mobile device XXX. The best deal service 110 may process information obtained from the account purchase history 1XX and the uploaded receipts 1YY in the combined transaction history 1ZZ. The processed information at each of the combined transaction histories 143, 145 to 1ZZ may be delivered to the database 150.

The database 150 may be accessed by the machine learning component 160. The machine learning component 160 may access the database 150 and process the combined transaction data provided to the database 150. For example, the machine learning component 160 may process the combined transaction data based on products identified by user preference settings of a respective mobile device, such as mobile device 101. Alternatively, or in addition, the machine learning component 160 may be operable to collect data from the database 150, process the data, and identify best deals for respective products of the number of products in the collected data. Both those products identified via user preference settings and those products identified upon the initiative of the machine learning component 160 that have the best deal may be forwarded to the notification component 165. The notification component 165 may take the forwarded best deals and send a notification to the respective mobile devices 101, 102 through XXX of the results of the evaluation by the machine learning component 160 for the identified products. More details of the process for obtaining the information needed to determine the best deal are explained with reference to FIG. 2.

Figure 2:
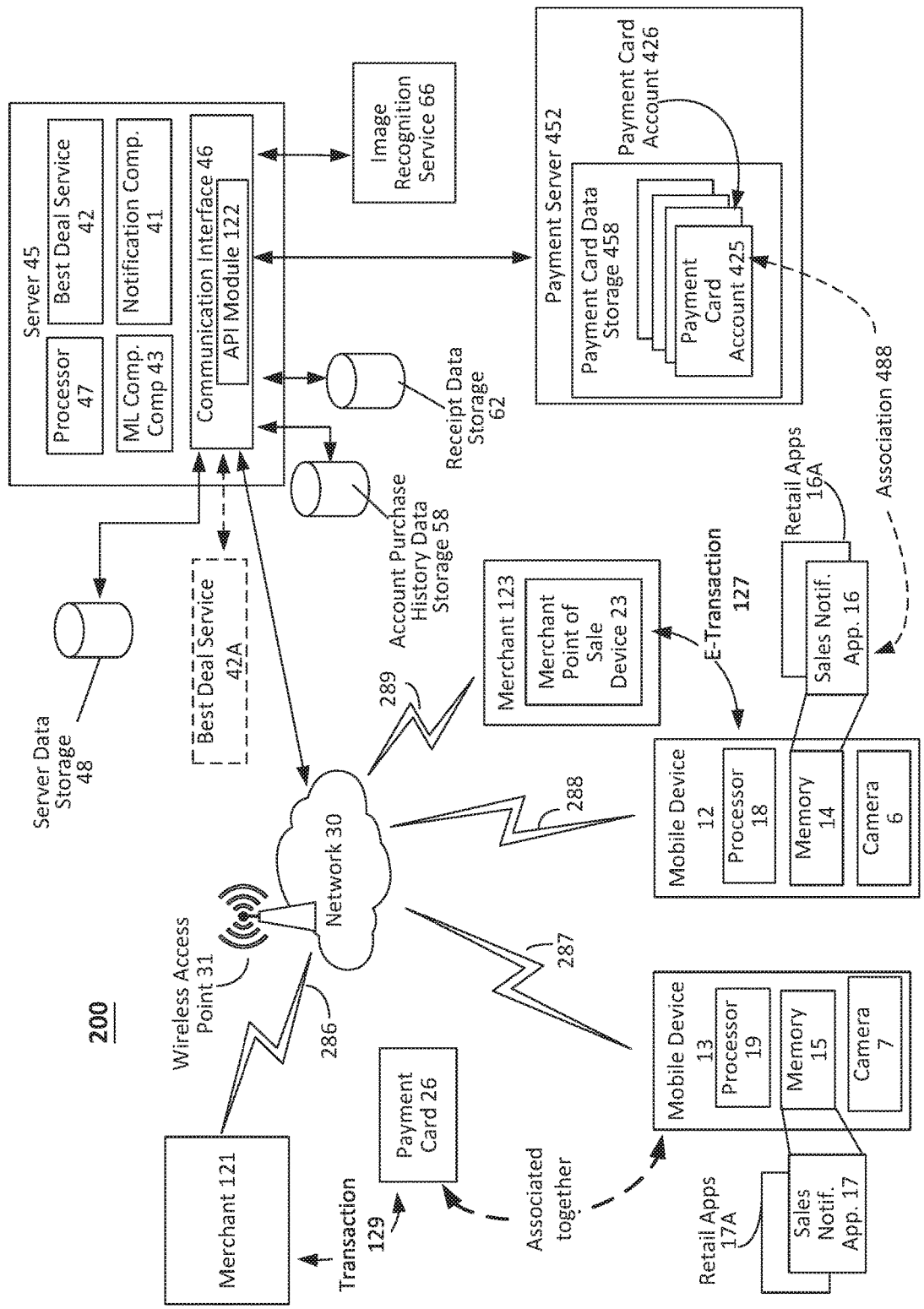
FIG. 2 illustrates an example of a system suitable for implementing the examples of the techniques and processes described herein.

FIG. 2 is a diagram depicting an example of a system 200 suitable for implementing the technique and process examples described herein. In the example of FIG. 2, the system 200 may include merchants 121 and 123, mobile devices 12 and 13, and server 45. The merchants 121 and 123, mobile devices 12 and 13, and server 45 may be communicatively coupled to a data network 30 that has a wireless access point 31 via wired or wireless communication links, such as respective communication link 286-289. The server 45 may include at least a processor 47, a best deal service 42, and a communication interface 46 and related components for implementing the best deal service 42. The related components to the server 45 may include an account purchase history data storage 58, a receipt data storage 62, a payment account server 452 that maintains a payment card data storage 458, and/or an image recognition service 66. The related components and others, such as network 30 and an instance of the best deal service 42A, may be coupled to the server 45 via the communication interface 46. The communication interface 46 may include an API module 122 that is operable to facilitate communication between instances of best deal services, such as best deal service 42A, and instances of sales notification applications executing on mobile devices, such as 16 and 17. The image recognition service 66 may be a third-party service that provides image recognition results to the server 45. As described in more detail with reference to other examples, the server 45 may provide images, such as an image of a receipt obtained by a camera 6 of the mobile device 12 or camera 7 of mobile device 13. The respective sales notification applications 16 and 17 and retail applications 16A and 17A, respectively, may have an association with a payment card account. For example, the sales notification application 16 of mobile device 12 may be associated with a payment card account, such as 425 in the payment card data storage 458 via the association 488. The association 488 of the sales notification application 16 with the payment card account 425 may enable the mobile device 12 to conduct payment card transactions as an e-transaction 127. Alternatively, or in addition, a banking application (not shown in this example) may be present in the mobile device memory 14 that has an association with the payment card account 425 that enables the mobile device 12 to participate in e-transactions, such as e-transaction 127. The sales notification application 16 may be operable to receive receipt information relevant to the e-transaction 127 via an application program interface (API) of the banking application or the like. In another or additional example, the sales notification application 16 may present a sales price notice on a display (not shown in this example) to notify the user of mobile device 12 of a sales price and indicate a location of the item on sale. The sales notification application 16 may also be operable to provide a user's location with respect to the item on sale. Instead of using the banking application, a retail application such as 16A or 17A may be used to make a payment with a credit card or other payment card on file. FIG. 2 illustrates another example of a transaction. In the alternate example, the mobile device 12 does not have to be the only means to make a purchase. As shown in, the merchant 121 executes a transaction 129 involving payment card 26. The payment card 26 may be associated with mobile device 13, which may allow sales notification application 17 and retail apps 17A to obtain a transaction receipt related to the transaction 129.

The server 45 may have one or more processors 47 operable to perform all or part(s) of the example functions and processes described in this disclosure. The server 45 may include, for example, one or more components, such as a machine learning (ML) component 43 and a notification component 41 that execute modules, models, or engines. The communication interface 46 may include an API module 122, each of which may include hardware and/or software components executable by the processor 47. The server 45 may be operable to utilize the one or more modules, models, or engines of the notification component 41 and the machine learning component 43 when performing various process examples described in this disclosure.

In some examples, the server 45, in addition to, or as an alternative to server data storage 48 and best deal service 42, may include a cloud computing platform (not shown) with scalable resources for computation and/or data storage and may run one or more applications on the cloud computing platform to perform various computer-implemented methods described in this disclosure.

The best deal service 42 may, e.g., include one algorithm model, or may include a plurality of algorithm models. The best deal service 42 may include, e.g., a trained machine learning model executed, for example, by the machine learning component, such as 160 of FIG. 1. Details of an example process implemented by the best deal service 42 are described in more detail with reference to FIG. 3. The notification component 41 may be operable, e.g., to generate and communicate (e.g., transmit) one or more notifications to a mobile device 12 or 13 through the network 30. For example, the notification component 41 may be operable to send results generated by the machine learning component 43 to a sales notification application, such as 16 or 17 executing on a respective mobile device, 12 or 13. The best deal service 42 executed by processor 47 may be operable, e.g., to monitor, track, process, itemize, anonymize, or standardize data received in the server 45. The API module 122 may, e.g., allow the user or purchaser to interact with one or more modules, models, or engines of the server 45. For example, the API module 122 may include, for example, a search engine that a user can interact with to search information of a product.

The server 45 may be operable to receive data from various sources (e.g., the merchants 121 and 123, mobile devices 12 and 13) in the system 200 through the network 30. The server 45 may further be operable to utilize the received data by inputting the received data into the best deal service 42 to produce a result. Information indicating the result may, e.g., be transmitted to a mobile device 12 or 13 over the network 30, and/or may be stored on, e.g., the server 45. In some examples, the server 45 may be referred to as a server system that provides a service including providing the information indicating the result to a mobile device 12 or 13.

The network 30 may be any suitable network or combination of networks and may support any appropriate protocol suitable for communication of data to and from the server 45 and/or the other components of the system 200. The network 30 may include a public network (e.g., the internet), a private network (e.g., a network within an organization), or a combination of public and/or private networks. The network 30 may comprise one or more networks that connect devices and/or components in the network layout to allow communication between the devices and/or components. For example, the network 30 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network 30 may be implemented using cellular networks, satellite, licensed radio, or some combination.

The merchants 121 and 123 may each be an entity that provides products. In this disclosure, the term "product," in the context of products offered by a merchant, encompasses both goods and services, as well as products that are a combination of goods and services. A merchant may be, for example, a retailer, a vehicle dealer, a grocery store, an entertainment venue, a service provider, a restaurant, a bar, a non-profit organization, a charitable organization, or other type of entity that provides products or services usable by a consumer or a user. The merchants 121 and 123 may each include one or more computer systems operable to gather, process, transmit, and/or receive data.

The mobile devices 12 and 13 (e.g., a device associated with a user) may operate a client program, such as the sales notification application 16 and 17 and retail applications 16A and 17A, that are also referred to as a user application herein, used to communicate with the server 45. This user application may be used to provide information to the server 45 and to receive information from the server 45. In some examples, the respective user applications may be a mobile application that is run on the mobile device 101. In some examples, the mobile device 101 may be an electronic mobile device (e.g., smartphone, tablet, pager, personal digital assistant (PDA)), a computer (e.g., laptop computer, desktop computer, server), or a wearable device (e.g., smartwatches). In further examples, the mobile device 101 may include any other device capable of providing or receiving data. The mobile device 101 may optionally be portable. The mobile device 101 may optionally be handheld. The mobile device 101 may be a device capable of connecting to the network 30, or any other network such as a local area network (LAN), wide area network (WAN) such as the Internet, a telecommunications network, a data network, or any other type of network. The mobile device 101 may be utilized to obtain identification of the user or the purchaser and/or authenticate the user or the purchaser. In an example, the sales notification application 16 or 17, when executed by the respective processor 18 or 19 of the mobile device 12 or 13, may be operable to control the camera and allow images of receipts from a product purchase transaction to be obtained and receipt images may be uploaded to a best deal service 42 of server 45. The uploaded receipt images may encompass image data, such as Red-Green-Blue (RGB) color system data, brightness data, other color system data or the like. The uploaded receipt images may be provided to an image recognition service 66 that may also perform optical character recognition of the uploaded receipt images in addition to image recognition. For example, the image recognition service 66 may be operable to recognize one or more of price information, product identification information, product category information, merchant name information, merchant location information, and product quantity information in the recognized text by applying an image recognition algorithm or an optical character recognition algorithm operable to recognize text in the image data.

The server 45 may be owned, operated, and/or part of an entity which may be any type of company, organization, or institution. In some examples, the entity may be a financial services provider. In such examples, the server 45 may have access to data pertaining to payment card transactions via the account purchase history data storage 58 receipt data storage 62, and/or payment card data storage 458. For example, if the entity is a card issuer, the entity may collect and store information related to the payment card transactions involving a credit card or debit card, such as payment card 26 or the like, issued by the entity in a payment card account 425 of the payment card data storage 458, the account purchase history data storage 58, and/or the receipt data storage 62. In such examples, the server 45 may still receive transaction information from other financial services providers (not shown). In an example, the server 45 upon execution of the best deal service 42 may receive product information from a number of instances of sales notification applications respectively operating on a number of other mobile devices (such as mobile devices 102 to XXX in FIG. 1) in addition to mobile devices 12 and 13. The best deal service 42 may obtain transactions associated with the payment account, wherein each transaction of the obtained transactions may include product information, such as a product name, product quantity and the like. The product information may be obtained from each transaction and be used in a comparison of where a selected product is available at the lower price. A result of the comparison may be provided to the product notification component 41.

The mobile device 12 may include a mobile device processor 18 and a mobile device memory 14. Similarly, the mobile device 13 may include a mobile device processor 19 and a mobile device memory 15. In the example, the mobile device processor 18 of mobile device 12 may be coupled to the mobile device memory 14. The mobile device memory 14 of mobile device 12 may be operable to store a sales notification application 16 and related data, such as data usable and data generated by the sales notification application 16. Similarly, the mobile device memory 15 of mobile device 13 may be operable to store a sales notification application 17 and related data, such as data usable and data generated by the sales notification application 17. The mobile devices 12 and 13 may include other components such as a mobile device processor, such as 18 and 19, respectively, a radio-frequency transceiver (not shown in this example), an output device (not shown in this example) that are described in more detail with reference to a later example.

In one or more examples, the sales notification application 16 may be coupled to a digital wallet (not shown) in the mobile device 12. The digital wallet may be operable, via the mobile device, to participate in a transaction with a point of sale device 23 of merchant 123. The point of sale device 23 may be communicatively coupled to the server 45 and/or the payment server 452 to authenticate and receive approval of product purchase transactions and provide payment account data for use by the best deal service 42.

In an operational example, the best deal service 110 may perform a number of functions, including functions related to control and access of components, such as the respective combined transaction histories 143, 145 to 1ZZ, the database 150, the machine learning component 160, and the like. For example, best deal service 110 may implement a process that may include obtaining product information from a number of product purchase receipts uploaded by a number of mobile devices executing an instance of a sales notification application as uploaded receipts 133, 135-1YY. For example, the receipt images with image data may be uploaded for aggregation by the best deal service in the database 150. The obtained product information from each product purchase indicated in the number of product purchases receipts may include a name of a product, a price of the named product, a purchase location of the named product, and a merchant name corresponding to the purchase location. The best deal service 110 may be operable to determine a similarity between the product information received from each product purchase of the number of product purchases represented by the respective uploaded receipts. The product information may be aggregated in a product purchase database based on the determined similarity between the product information.

After a time, the database 150 may include product information about hundreds or thousands of products from a number of mobile devices that utilize the best deal service and the sales notification application. For example, a named product (which may also be referred to as "a selected item" herein and may be used interchangeably) and a location at which the named product (or selected item) has been purchased previously may be received in a deal information request from a respective instance of a sales notification application executing on a respective mobile device of the number of mobile devices 101, 102 to XXX. For example, the machine learning component 160 may be operable to compare the named product and the location with the aggregated information in the product purchase database. The machine learning component 160 may be operable to provide information to a notification component 165. The notification component 165 may be operable to output a result of the comparing to the respective instance of the sales notification application executing on the respective mobile device that sent the product notification request. The result may include a product name, a price of the named product, a location at which the named product is available for purchase similar to the named product and the respective location of the product similar to the named product, or the like. Based on receiving the result, the sales notification application may generate an alert or notification on the mobile device notifying the user of the sale. Alternatively, or in addition, the sales notification application may enable a contactless payment card associated with the respective instance of the sales notification application for purchase of the named product at the lower per unit price at the different location.

The disclosed example system and techniques are described with reference to FIGS. 1-6. It may be helpful to describe an example of a system configuration operable to enable the sales notification application functions and best deal service techniques as described herein.

In an operational example, the mobile device processor, such as 19 of mobile device 13, when executing the sales notification application 17 stored in the mobile device memory 15 may be operable to enroll the mobile device in the best deal service 42. For example, enrollment may include generating the association with a payment card account and a payment card, input and setting of user preferences, such as a preferred products for sales notifications, frequency of sales notifications (e.g., daily, monthly, hourly or some other period of time) and the like.

Figure 3:
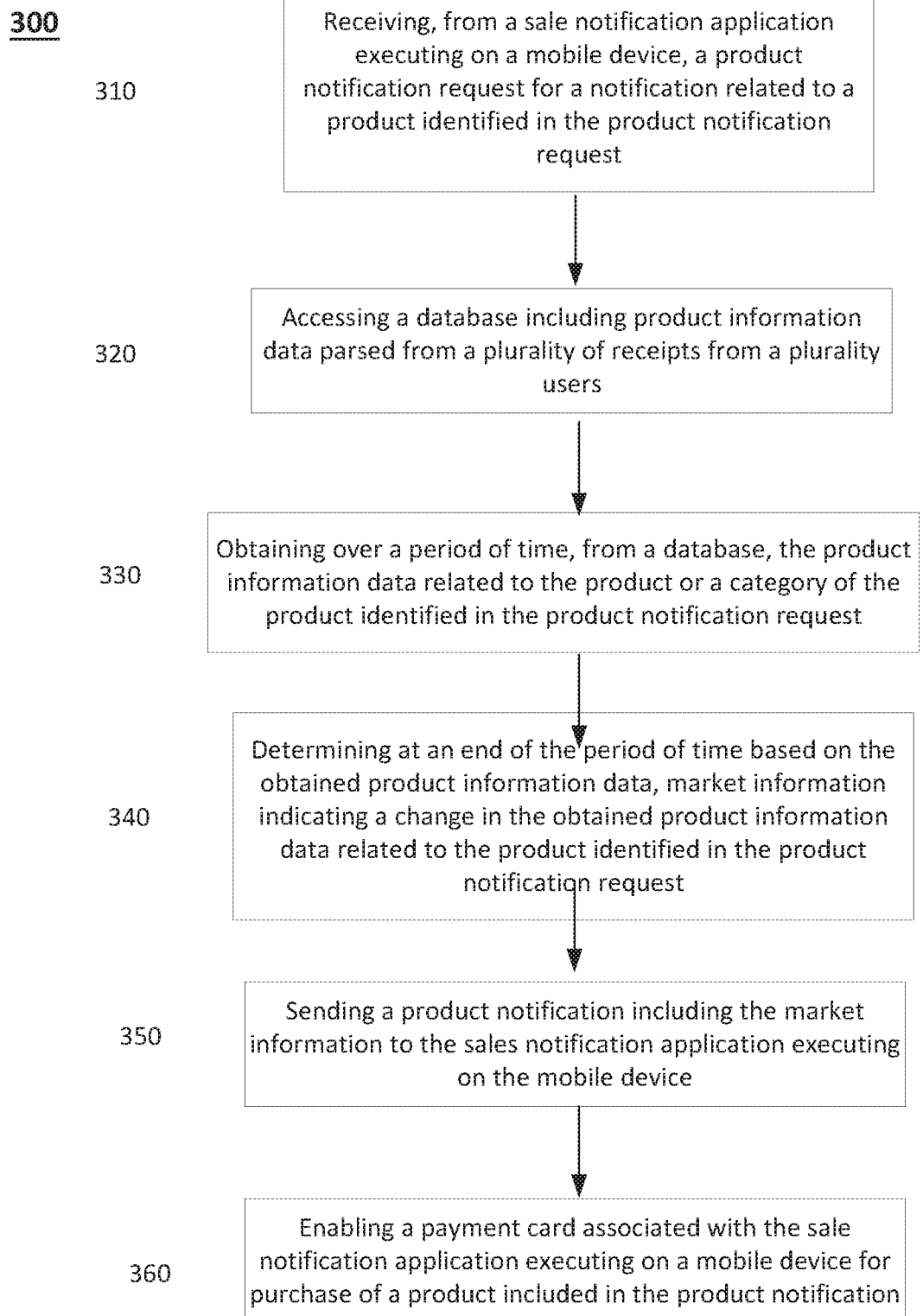
FIG. 3 illustrates an example of a process flowchart for providing a best deal service as described herein.

FIG. 3 illustrates an example of a process flowchart for providing a best deal service as described herein. In this example, the server such as 45 of FIG. 1 may be operable to perform different functions related to determining a best deal service.

In the example of FIG. 3, the server may receive a request from a sales notification application executing on a mobile device to execute the best deal service.

In an example, prior to step 310, a process may be performed as mentioned with reference to FIGS. 1 and 2, a number of mobile devices may collect images of purchase transaction receipts that may be uploaded as image data by a sales notification application to the best deal service 42 executing on a server 45. The best deal service may be operable upon receiving receipt data as image data from a number of product notification participant mobile devices and may forward the image data to an image recognition service that may apply an image recognition algorithm to the collected image data. The image recognition algorithm, such as an optical character recognition algorithm or the like, may be operable to recognize text, handwriting, and/or alphanumerical characters in the image data. The image recognition algorithm, and in some examples, in combination with components of the best deal service, may be operable to recognize the text, handwriting, and/or alphanumerical characters related to one or more of respective price information, respective product identification information, product category information, respective merchant name information, respective merchant location information, and respective product quantity information in the recognized text. The recognized price information, product identification information, product category information, merchant name information, purchase location information, or product quantity information may be stored in the database. The database may be maintained by the best deal service 42 or the server 45 and may be located in the server data storage 48, account purchase history data storage 58, the receipt data storage 62 or the payment card data storage 458.

The process 300 of FIG. 3 includes a number of steps. At 310, the server may receive from a sales notification application executing on a mobile device a product notification request. The product notification request may be a request for receiving a notification related to a product identified in the product notification request. The server may provide the request to a best deal service. For example, the request may be sent from a sales notification application executing on a mobile device, such as 12 or 13 in the system example of FIG. 2 to the server 45 that executes the best deal service 42. In a first example, a user of the sales notification application may input a request to receive sale information related to a specific brand of soda or coffee that is forwarded to the best deal service for evaluation and monitoring.

At 320, the best deal service executed by the server may be operable to access a database, such as 150 of FIG. 1 or receipt data storage 62 and/or account purchase history data storage 58 of FIG. 2. The database may be distributed and may include product information data parsed from a number of receipts from a number of different users.

With reference to the example of FIGS. 1 and 2, a process for populating the database may include obtaining price information (e.g., $1.25), product identification information (e.g., soda, 16 ounce bottle and the like), product category information (e.g., food, beverage), merchant name information (e.g., Joe Maraia's Deli), product purchase location information (e.g., 123 Main Street, Washington D.C.; K street; Annapolis Mall or the like), and product quantity information (e.g., 1, 2, 6 pack, multipack, pair or the like) for each product included in the receipt data. The best deal service may be operable to parse the received receipt data to obtain the respective price information, respective product identification information, respective product category information, respective merchant name information, respective product purchase location information, respective product quantity information, and/or the like. The best deal service may be further operable to utilize a machine learning component, such as 160 of FIG. 1, to identify a pricing-related pattern that may be identified by applying a machine learning algorithm to the respective price information, respective product identification information, respective product category information, respective merchant name information, respective product purchase location information, and respective product quantity information.

The machine learning component when applying the machine learning algorithm may be operable to process the pricing-related pattern identified by the machine learning algorithm for inclusion in the product notification.

The machine learning algorithm may be trained using receipt data to recognize pricing-related patterns that may correspond to a received product notification request. For example, the obtained information may be evaluated by a machine learning algorithm that may be trained using information obtained from receipt data or dummy data. In an example, the machine learning component recognizing pricing-related patterns by applying a machine learning algorithm to the respective price information, product identification information, product category information, merchant name information, merchant location information, product quantity information in the database, or the like.

In response to receiving any identified pricing-related patterns, the best deal service may be operable to aggregate the respective price information, the respective product identification information, the respective product category information, the respective merchant name information, the respective product purchase location information, and the respective product quantity information with previously-provided price information, previously-provided product category information, previously-provided merchant name information, previously-provided purchase location information, and previously-provided product quantity information in the database. The best deal service may be operable to compare the product identified in the product notification request and a location associated with the product identified in the product notification request with the aggregated information in the product purchase database.

In an example, the best deal service may be operable to output marketing information based on the comparing to the sales notification application. The marketing information includes a product name, a price of the named product, and a location at which the named product is available for purchase similar to the named product and the location for inclusion in the product notification sent to the sales notification application. The sales notification application may, for example, be operable to recognize pricing-related patterns by applying a machine learning algorithm to the respective price information, product identification information, product category information, merchant name information, merchant location information, and product quantity information in the database.

The best deal service may obtain over a period of time from the database product information data related to the product or a category of the product identified in the product notification request (330). For example, the product information data may be parsed from a number of receipts provided by a number of users over the period of time. The period of time may be an hour or less, several hours, a day, a week, a month, or the like. The period of time may be selectable by the user via an input to user preference settings of the sales notification application. Alternatively, the best deal service may select the period of time based on time of year, such as around a holiday, a change in season, or the occurrence of an event, such as an election, sporting event or a similar event, start of the school year. The product information data parsed from the receipts may also include a product name, product price information, product details, product purchase location information, a merchant name, or the like. Examples of product details may include one or more of: a product size, a product quantity, a product name or a product brand name. Product purchase location information may include one or more of a name of a city, a name of an area within the named city, a zip code, global positioning system coordinates, a street address, a merchant name, or the like. Of course, any personal information, payment account information or other sensitive or personal information may not be collected, may be anonymized, or modified.

At the end of the period of time and based on the obtained product information data, the best deal service may determine market information related to the product or the category of products in the product notification request (340). Market information may include prices that are less than or greater than individual product prices, or more economical (e.g., a quantity-based discount) than an individual product price, or the like.

In response to identifying a pricing-related pattern recognized by the machine learning algorithm from the recognized pricing-related patterns that correspond to the received product notification request, the pricing-related pattern identified by the machine learning algorithm may be processed to determine whether the product and related merchant information is to be included in the product notification. For example, the processing may be an evaluation of user details, such as mobile device location, user preferences (e.g., regularly or normally purchased products, location of product purchased and the like), and product details provided by other participants (e.g., users) through the uploading of their receipts and/or payment card account transactions in the best deal service. Merchants that participate may also upload pending promotional sales for processing by the best deal service.

The best deal service may be operable to send a product notification including the determined market information to the sales notification application executing on the mobile device (350). An example of a product notification may include additional information such as graphical information. For example, deal information may be presented on a map on a graphical user interface with indications of where the product identified in the product notification request is available for purchase: at a lower individual price, at a quantity discount, as part of a combination sale, as a seasonal sale, or the like.

Figure 4A:
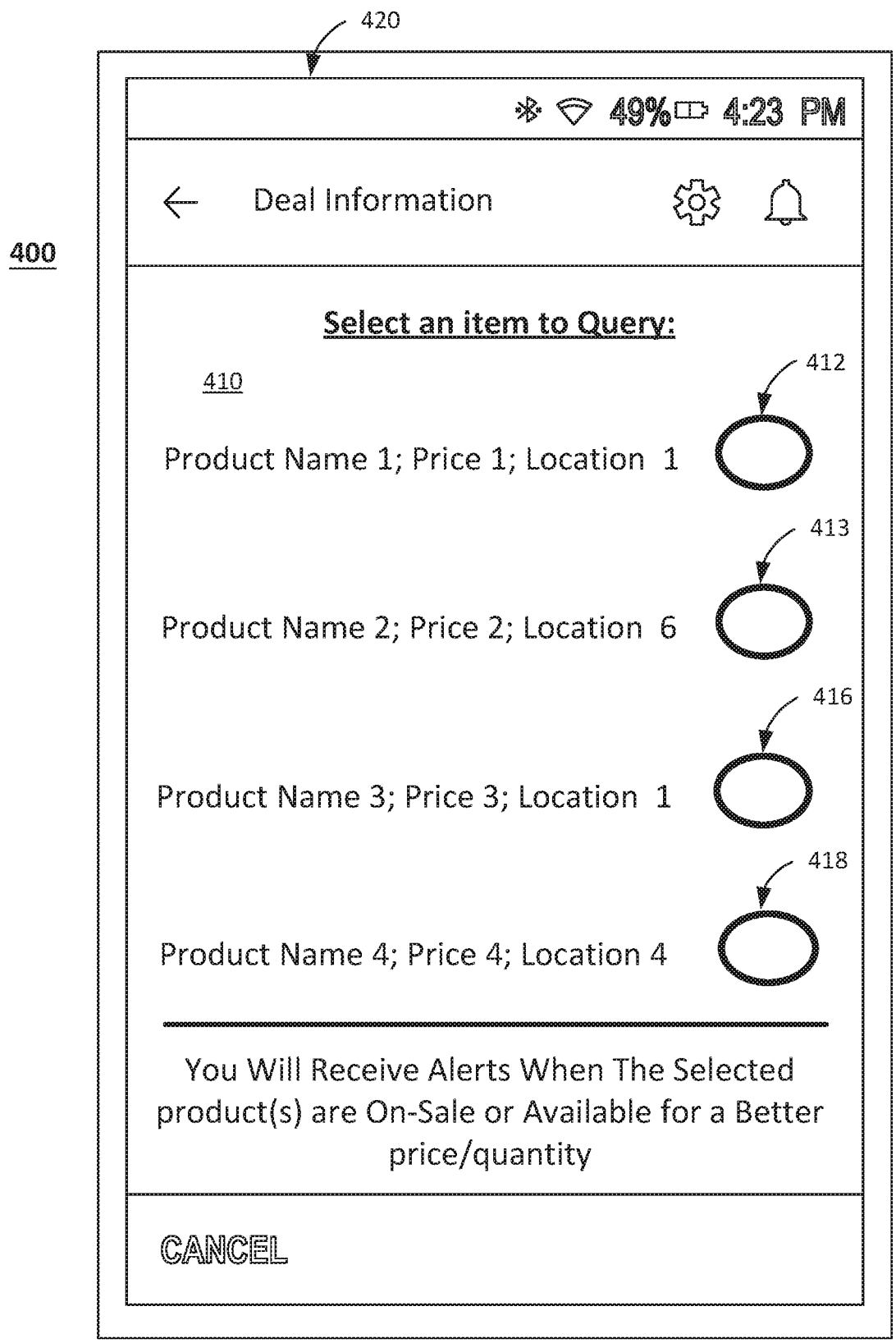
FIG. 4A illustrates examples of a graphical user interface presenting an aspect of an example of a sales notification application.

At 360, the best deal service may enable a payment card associated with the sales notification application executing on a mobile device for purchase of a product included in the product notification As shown in FIG. 4A, a mobile device 400 may include an input/output device 420, which may be a touchscreen display that enables the input and output of information and data. The input/output device 420 (e.g., a touchscreen display or the like) of the mobile device 400 may enable presentation of a graphical user interface 410. The mobile device 400 may be similar to or the same as mobile device 12 or 13 of FIG. 2. In an example in which input/output device 420 is a touchscreen display, the graphical user interface 410 may present on the touchscreen display details related to functions provided by the sales notification application hosted on the mobile device 12. For example, the user interface 410 may present to the user different products that may be the user's favorite or most frequent purchases. In the example, the sales notification application may generate a prompt for selection of a query for analysis of a best deal. In the example, button 412 of the user interface 410 may enable selection of Product Name 1; Price 1; Location as the query for analysis. Alternatively, or in addition, the user may select button 413, 416 and/or 418. Upon receipt of the respective input associated with the selection of one or more of the buttons 412, 413, 416 or 418, the sales notification application may cause the best deal service to perform on a regular basis, e.g., hourly, daily, or some other period of time, upon the occurrence of some event, such as a mobile device associated with the selected product(s) launching the sales notification application, or the like, an evaluation of information related to the selected product(s) in a database, such as 150 of FIG. 1. The best deal service may be operable to provide future alerts of changes in price whenever the evaluation is performed.

Figure 4B:
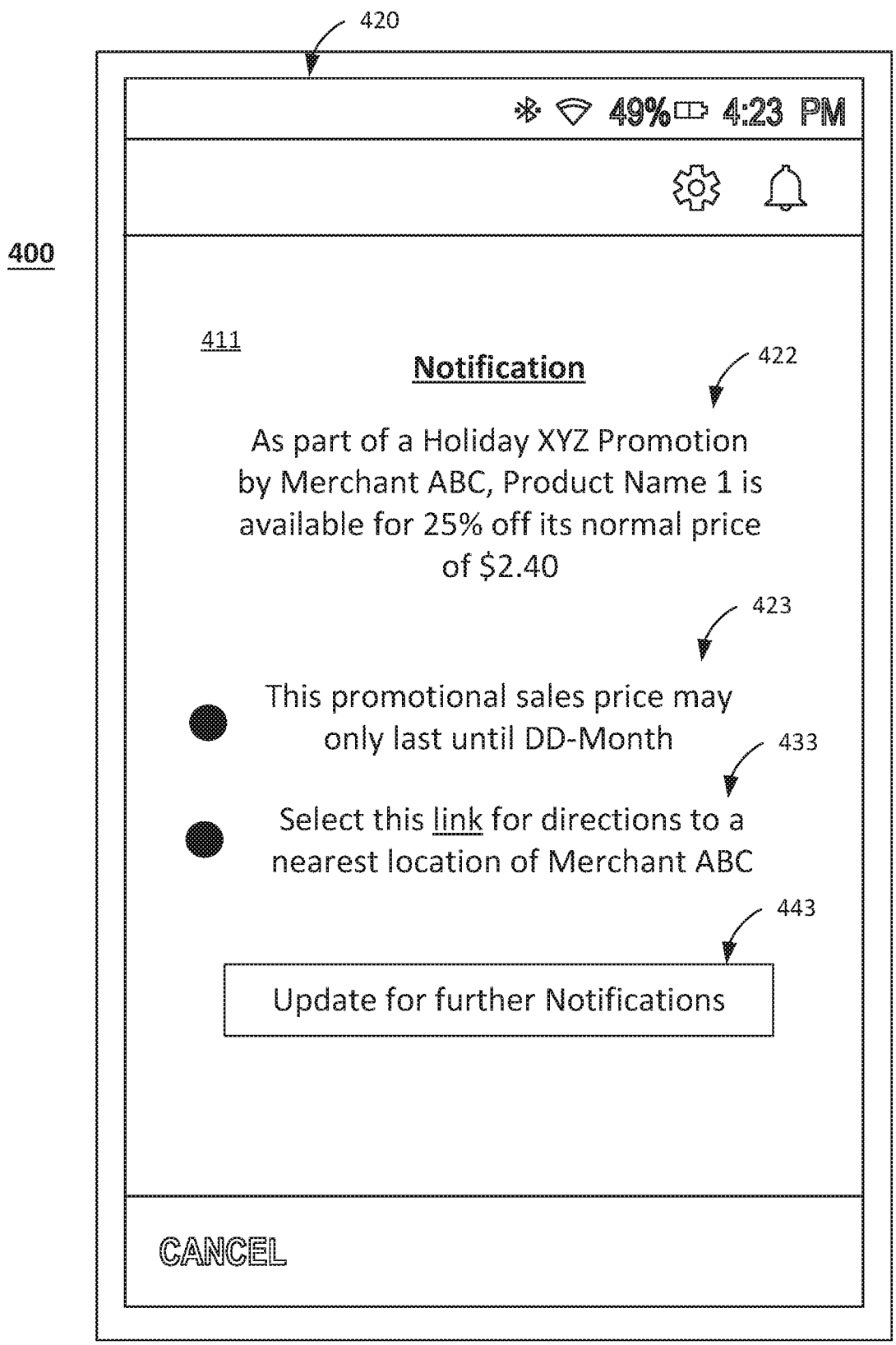
FIG. 4B illustrates examples of a graphical user interface presenting another aspect of the sales notification application example.

For example, the evaluation of the information may identify when a price (or other criteria, such as quantity per item) changes to be a more economical purchase in comparison to a previous purchase and, in response, a notification may be generated alerting the user that a product included in the query (i.e., a product the user normally shops for) is now available for a better deal, better price than usual, or the like. As shown in FIG. 4B, the best deal service may, for example, return the results of the evaluation (not shown) to the user interface 411. The results of the evaluation may not be immediate unless a better price or sale is available immediately. For example, at a time after entry of a query as shown in in FIG. 4A, the best deal service may receive an indication that a merchant, such as merchant ABC, for example, is having a sale on a product that was the subject of a query from FIG. 4A, such as Product Name 1. The indication may be provided by the merchant who is a participant in the best deal service or by the best deal service evaluating receipts provided by other user participants. As shown in FIG. 4B, in response to receiving the indication of a promotional sale, the best deal service may cause the sales notification application on the mobile device 400 to generate an alert for presentation on the input/output 420 (e.g., a touchscreen display) via the graphical user interface 411. In the example of FIG. 4B, the graphical user interface 411 may present the notification 422 notifying the user of the promotional sale of Product Name 1 at the merchant ABC. The notification 422 may include details of the promotional sale, such as 25% off the normal price of $2.40, 10 products for $20.00, 2 products for $3.00, 15% off the normal price, or the like. In addition, the sales notification application may present additional information related to the notification, such as how long the promotion or price reduction is expected to last (423), a link to direction to a nearest location of Merchant ABC to the mobile device (433), or the like. The user interface 411 may also present an input for updating the notifications (443).

Figure 5:
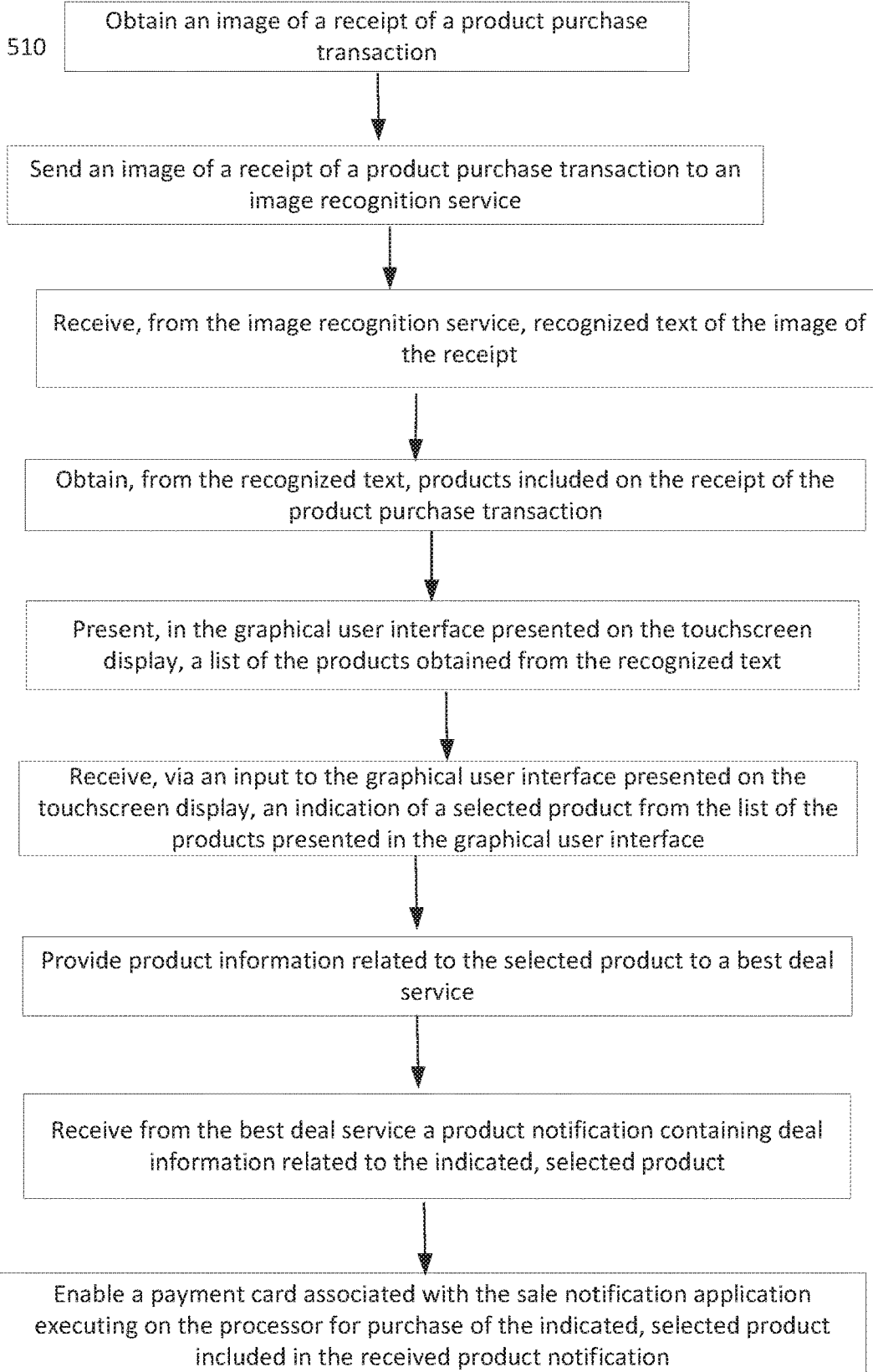
FIG. 5 illustrates an example of a process flowchart for providing a best deal service as described herein.

FIG. 5 illustrates an example of a process from a viewpoint of a mobile device utilizing the best deal service in the server. The example process may be implemented via a non-transitory computer readable medium embodied with programming code having instructions that implement the illustrated process.

For example, the programming code embodied on the non-transitory computer readable medium may provide a sales notification application which when executed by a processor enables the processor to engage in a transaction utilizing the best deal service through the sales notification application with a point of sale device at a merchant. The sales notification application may operate in concert with the server.

In an example process, a best deal service may be implemented via a server that may be operable to provide different functions. The server may include a processor and data storage, a machine learning component, the best deal service and a notification component. The best deal service is operable to execute and manage a program that identifies the best deals available for products purchased by subscribers of the best deal service. The system includes a mobile device that includes a mobile device processor, a radio-frequency transceiver, a communication interface operable to connect to an enterprise network via a data network, an output, and a mobile device memory that stores a sales notification application. In an example, a touchscreen display may be operable to receive inputs and present a graphical user interface, such as that described with reference to FIGS. 4A and 4B, generated by the processor. The sales notification application may include programming code stored in the memory and when executed by the processor may be operable to perform different functions in performance of a process, such as process 500 of FIG. 5.

In an operational example of process 500, the apparatus may be operable to establish, at 510, an image of a receipt of a product purchase transaction may be obtained. At 520, the apparatus may send an image of a receipt of a product purchase transaction to an image recognition service. The image recognition service may be provided by a third-party provider or may be incorporated into a system managed by an entity such as a financial institution. Alternatively, or in addition, the image recognition service may be implemented as, in the system example of FIG. 2, as image recognition service 66 that is communicatively coupled to a best deal service 42. The apparatus may receive from the image recognition service recognized text of the image of the receipt.

For example, product information may be obtained from product purchase receipts uploaded by mobile devices executing an instance of a sales notification application. The apparatus may be operable to process the recognized text via the sales notification application to enable building of the database, such as 150. Similarities may be determined between the product information received from each product purchase of the plurality of product purchases. The product information from each of the uploaded receipts may be collected based on the determined similarity between the product information. In the example, the sales notification application may be operable to obtain products included on the receipt of the product purchase transaction from the recognized text (530).

In an example, the user may select an item and a location at which the selected item has been purchased previously from a list of items (i.e., products) that may be provided to the best deal service and may be received for comparison to the aggregated information in a product purchase database. A comparison result may be output to the sales notification application as a product for inclusion in a list. The sales notification application may be operable to present, in a graphical user interface presented on a touchscreen display, a list of the products obtained from the recognized text (540). In an example, such as that shown in FIGS. 4A and 4B, the sales notification application may be operable to present, at 550, additional information with respect to the listed products in the graphical user interface. The sales notification application may receive, via an input to the graphical user interface presented on the touchscreen display, an indication of a selected product from the list of the products presented in the graphical user interface (560). The selected product may be a product that a user desires to receive additional information. In the example, the selection of the product via the graphical use interface may be an example of one technique for indicating that additional information regarding the product is desired, but other techniques are also contemplated, such as voice selection, selection via user preferences (e.g., organic products only, gluten-free, or the like) gesture selection or the like.

An example of another technique executable by the sales notification application may be the identification of a frequently or regularly purchased product. For example, a mobile device or a payment card associated with the mobile device may be used in the purchase of a 16 ounce cup of coffee and a donut every morning between 8:30 am and 10:00 am at a particular location. The sales notification application in combination with the best deal service may automatically, based on noting the pattern (e.g., daily, same product purchase and same particular location) of the purchase transaction, identify less expensive offerings of a 16 ounce cup of coffee and a donut at other locations in close proximity to the particular location may be provided to the best deal service.

Returning to the example of FIG. 5 at 570, the product information related to the selected product may be provided to the best deal service. The product information may include, for example, a portion of the recognized text from the receipt related to a product price, a location of the sale of the product, a quantity of the product involved in the sale of the product. Information related to a payment card number or account or username may be excluded from being included with the product information. At 580, the apparatus may receive from the best deal service a product notification containing deal information related to the selected product. The deal information may include an indication of a lower price than in the image of the receipt and an indication of a location of the merchant offering the product at the lower price. In addition, the best deal service may enable a payment card associated with the sales notification application executing on the processor for purchase of the selected product included in the received product notification (590). For example, the sales notification application via the processor of the mobile device may be operable to establish a linkage to a payment account and a payment card associated with the payment account.

In a further example, the product notification may further include an indication of at least one of: a location where the selected product has a lower price than in the image of the receipt, a location where a quantity discount is obtainable, a merchant name that has the selected product in stock and at a lower price than in the image of the receipt, a location relative to user-preferred locations where the selected product has a lower price than in the image of the receipt.

The sales notification application may be operable, via use of a communication interface and a transceiver coupled to a communication interface and operable to communicate with a payment account server, to establish the linkage to the payment account and the payment card associated with the payment account by sending a message to a payment account server, such as 452 of FIG. 2. For example, the message may include authentication information usable to authenticate that the apparatus is associated with the payment account and the payment card. The payment account server 452 may be operable to authenticate the apparatus, such as mobile device 12 or 13, and the respective instance of the sales notification application 16 or 17, as being associated with a payment account and payment card maintained in the payment card data storage 458. The sales notification application may be operable to receive, via the communication interface, an authentication message from the payment account server indicating the apparatus has been authenticated as being associated with the payment account and the payment card. A product from a plurality of payment card-purchased products in product purchase transactions of the payment card may be obtained by the sales notification application for inclusion and presentation in the list of the products obtained from the recognized text. The sales notification may indicate to the best deal service a user preference setting that the product information related to the products in the recognized text and products obtained from the product purchase transactions of the payment card are to be evaluated with respect to product information stored in a database that may be maintained in receipt data storage 62, server data storage 48, account purchase history data storage 58, or a combination of the three. In an example, the sales notification application may be operable to execute a process enabling selection of a user preference setting in which product purchase transactions of the payment card are provided to the best deal service. In addition, the sales notification application may be operable to enable selection of another user preference setting that enables products in the product purchase transactions of the payment card to be presented in the list of the products obtained from the recognized text.

The sales notification application may be further be operable to enable the display of a mobile device to present on the graphical user interface deal information on a map with indications of where the selected product is available for purchase, for example, at a lower individual price, at a quantity discount, as part of a combination sale, as a seasonal sale, or the like.

The sales notification application may also enable a user to enter user preferences for functions of the sales notification application. In example, the sales notification application may receive, via the touchscreen display 620 executing on the mobile device, user preferences for the collection of user receipts (e.g. via user of the camera) or electronically transmitted receipts (i.e., those receipts received via email or short message service (SMS), multimedia messages (MMS) or other media services). For example, the user preferences may include instructions and/or permission related to the sharing of the receipt information with the best deal service 42, or the like. In a more detailed example related to user preferences and settings, the sales notification application and/or the best deal service may provide additional features. For example, the additional features may include providing alerts based on regularly purchased products when the products have gone down significantly in price. In a specific example, a mobile device, such as 12 or 13, may be used in a product purchase transaction for a single soda every day. If the mobile device, such as either of 12 or 13, is associated with a payment account, the purchases may be gleaned from recorded purchases from the account purchase history data storage 58. In the example, mobile device 12 is associated with a payment account via association 488, while mobile device 13 is associated with a payment account via the payment card 26, which may, for example, have an association with a payment card account 426 Alternatively, if the mobile device is not associated with a payment account, the mobile device may have an opportunity to take pictures of receipts from a product purchase transaction and upload the pictures of the receipts via a sales notification application to the best deal service executing on a server. In some examples, the user of the sales notification application may be, for example, based on an incentive structure or based on a points system sort of like other services that related to popular mobile navigation or gasoline applications.

In the example, the best deal service or sales notification application may be an opt-in service. Once a user has opted into the service provided by the sales notification application or best deal service via their mobile phone, the sales notification application and/or best deal service may be informed that the user is interested in pricing. For example, the sales notification application and/or best deal service may look at product-level transaction data provided in the receipts as well as the product-level transaction data already stored in a database of sales transaction data. Monitoring by the best deal service may be turned ON/OFF via the sales notification application for specific products or a frequency or threshold of alerts may be set (e.g., alert provided monthly or daily or 10 total alerts within a time frame (e.g., day, month or week). The best deal service may also be able to identify or be made aware (via the machine learning component) of sales cycles (e.g., seasonal items go on sale late in the prior season—Spring items go on sale in late Winter, while Summer items go on sale in late Spring, or picnic items, such soda, go on sale in Spring and Summer, or on particular dates such as 4th of July). For example, sales on particular products or categories of products may be identified based on user-provided data received from a particular merchant. In overstock situations, the store may overstock and need to reduce inventory by having a discount sale. In other example, a store may receive a shipment of soda every six weeks. Five weeks may pass, and the store is about to receive another shipment, and may need to reduce the amount of older stock in the store's inventory. Based on the data provided by the users, the data may be aggregated to identify such patterns using machine learning techniques, in particular pattern recognition techniques.

The user via the notification component may be notified of the expected sales and the notification may include information related to how much less expensive the product may be if purchased in bulk, for example. In another example, the user may also upload an indication that the user purchased the last product, or the product is no longer available.

A mobile device supporting the sales notification application and techniques described herein may include a variety of different types of user interface elements. For example, FIG. 6 illustrates a block diagram illustration of an example of a mobile device usable for implementing the techniques and processes discussed with reference to the examples of FIGS. 1-5.

The mobile device 611 may be a smart phone including a display device, such as a touchscreen display 620. The touchscreen display 620 may be coupled to the processor 612 and be operable to present screen content and receive inputs via touch sensors 622. Examples of touchscreen type mobile devices, such as mobile device 611, may include (but are not limited to) a smart phone, personal digital assistant (PDA), tablet computer, smart watch, or another portable device. However, the structure and operation of mobile device 611 that utilizes a touchscreen is provided by way of example; and the subject technology as described herein is not intended to be limited thereto. For purposes of this discussion, the example touchscreen display 620 of the mobile device 611 may be operable to display content, such as the graphical user interface example of FIGS. 4A and 4B and receiving user input as (or as part of) the user interface.

There are a variety of ways that a mobile device 611 may be operable to obtain information as to current location of the device. In our example, the mobile device 611 includes a global positioning satellite (GPS) receiver 632 and associated antenna 634. GPS is a space-based satellite navigation system that provides location and time information practically anywhere on Earth. A rechargeable battery 629 may provide electrical power sufficient to power the various components of the mobile device 611. The mobile device 611 is also equipped with a camera 639 that is coupled to the processor 612 and controllable to collect images via an input to the touchscreen display 620. For example, the sales notification application 647 may be operable to control the mobile device 611 to enable collection images of receipts from purchase transactions via the camera 639 and send the collected images to a best deal service (shown in other examples).

Figure 6:
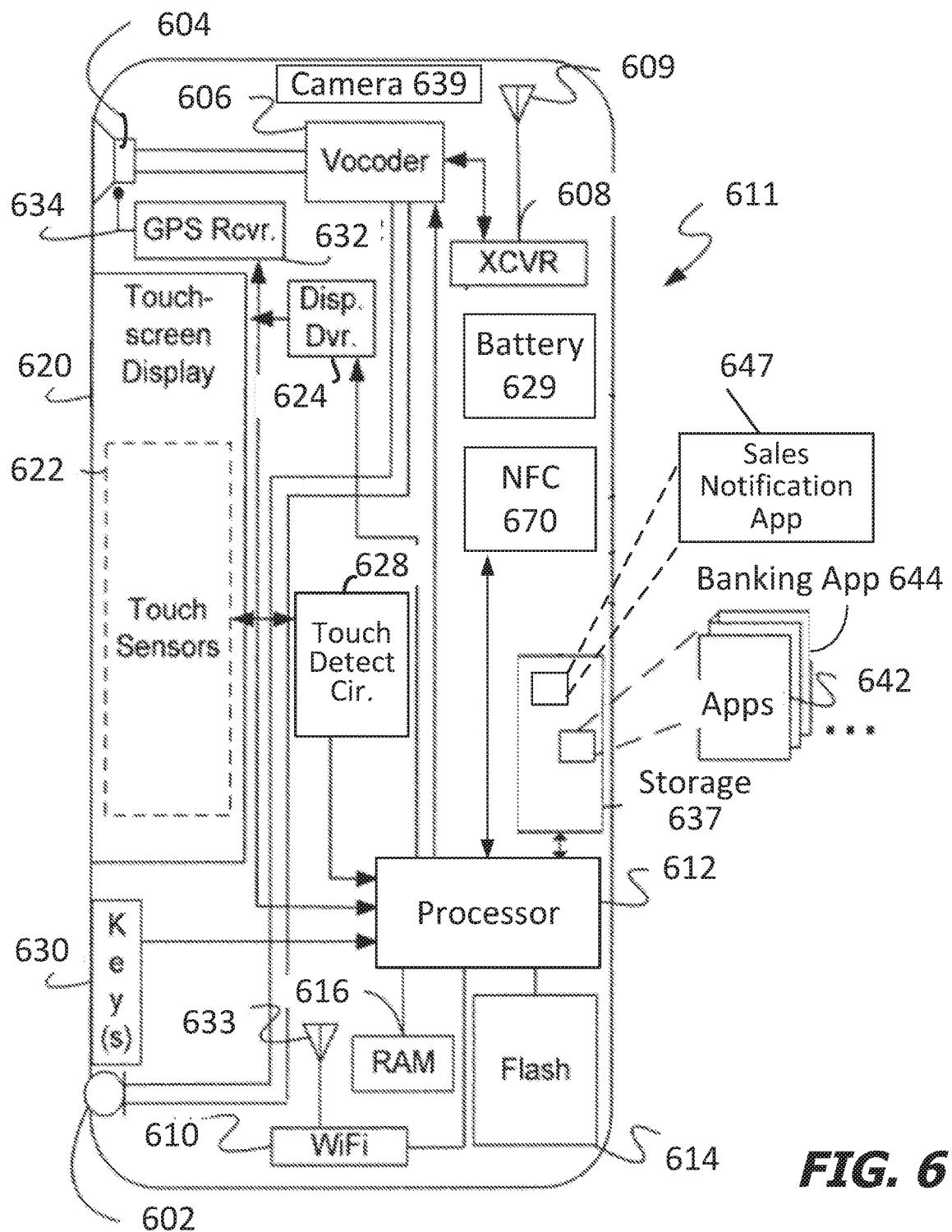
FIG. 6 illustrates an example of a mobile device usable for implementing the techniques and processes discussed with reference to the examples of FIGS. 1-5.

For discussion purposes, in the smart phone example of a mobile device shown in FIG. 6, the user interface elements of mobile device 611 include a touchscreen display 620 (also referred to herein as "touchscreen 620" or "display 620"). For output purposes, the touchscreen display 620 includes a display screen, such as a liquid crystal display (LCD) or the like. For input purposes, touchscreen display 620 includes a plurality of touch sensors 622. Other interface elements may include a keypad including one or more keys 630. For example, the keypad may be implemented in hardware as a T9 or QWERTY keyboard of mobile device 611 and keys 630 may correspond to the physical keys of such a keyboard. Alternatively, keys 630 (and keyboard) of mobile device 611 may be implemented as "soft keys" of a virtual keyboard graphically represented in an appropriate arrangement via touchscreen display 620. The soft keys presented on the touchscreen display 620 may allow the user of mobile device 611 to invoke the same user interface functions as with the physical hardware keys. In some implementations, the microphone 602 and speaker 604 may be used as additional user interface elements, for audio input and output, including with respect to some functions related to the processing related to engaging with the sales notification application 647, as described herein.

For output, touchscreen display 620 is a display device used to present information (e.g., text, video, graphics or other visible content) to the user of mobile device 611. Processor 612 controls visible display output on the LCD or other display element of the touchscreen display 620 via a display driver 624, to present the various visible outputs to the device user.

In general, touchscreen display 620 and touch sensors 622 (and one or more keys 630, if included) are used to provide the textual and graphical user interface for the mobile device 611. In an example, touchscreen display 620 provides viewable content to the user at mobile device 611. Touchscreen display 620 also enables the user to interact directly with the viewable content provided in the content display area, typically by touching the surface of the screen with a finger or an implement such as a stylus.

As shown in FIG. 6, the mobile device 611 also includes a touch detect circuit 628 coupled to touch sensors 622 for detecting the occurrence and relative location/position of each touch with respect to a content display area of touchscreen display 620. In this example, touch detect circuit 628 is operable to provide processor 612 with touch-position information based on user input received via touch sensors 622. In some implementations, processor 612 is operable to correlate the touch position information to specific content being displayed within the content display area on touchscreen display 620. The touch-position information captured by touch detect circuit 628 and provided to processor 612 may include, but is not limited to, coordinates identifying the location of each detected touch with respect to the display area of touchscreen display 620 and a timestamp corresponding to each detected touch position.

In the example shown in FIG. 6, the mobile device 611 includes a microphone 602 for audio signal input and a speaker 604 for audio signal output. The microphone 602 and speaker 604 are communicatively coupled to a voice or audio encoder/decoder (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 6, the mobile device 611 includes at least one transceiver (XCVR) 608, which may be a digital transceiver for digital wireless communications via a wide area wireless mobile communication network, although the mobile device 611 may include additional digital or analog transceivers (not shown). The transceiver 608 conforms to one or more of the various digital wireless communication standards utilized by modern mobile networks. Examples of such transceivers include (but are not limited to) transceivers operable to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information including digitized audio signals, still image and/or video signals, web page information for display as well as web related inputs, and various types of mobile message communications to/from the mobile device 611. Transceiver 608 connects through radio frequency (RF) send-and-receive amplifiers (not separately shown) to an antenna 609. Transceiver 608 may also support various types of mobile messaging services, such as short message service (SMS), enhanced messaging service (EMS), and/or multimedia messaging service (MMS). In addition, the mobile device 611 may include a near-field communication (NFC) device 670 that may be communicatively coupled to the sales notification application 647 and/or the banking application 644 via the processor 612 that enables contactless product purchase transactions and communication of receipt information.

In an example, the transceiver 608 may be coupled to the processor 612 and operable to exchange communications. The processor 612 of the mobile device 611 may be further operable to perform additional functions, including functions to establish, using the transceiver, a connection with a server, such as server 45 of FIG. 1, to exchange communications. Via the connection with the server 45 via the sales notification application 647, the mobile device 611 may be able to obtain various information, such as a lower price per unit, an indication of a seasonal sale with a location or merchant name, an overstock sales event with a location or merchant name, similar product sale notification (e.g., Brand A product instead of the usually purchased Brand C product), and the like. The processor upon execution of the sales notification application 647 may implement the examples as discussed above with reference to FIGS. 1-5.

The mobile device 611 may also include a Wi-Fi transceiver 610 and associated antenna 633. Although Wi-Fi is used here as the example, the transceiver 610 may take the form of any available two-way wireless local area network transceiver of a type that is compatible with one or more standard protocols of communication implemented in wireless local area networks, such as one of the Wi-Fi standards under IEEE 802.11 and/or WiMAX.

The mobile device 611 further includes a processor 612, which serves as a programmable controller for mobile device 611 by configuring mobile device 611 to perform various operations, for example, in accordance with instructions or programming executable by processor 612. For example, such operations may include various general operations of the mobile device 611 as well as operations related to the screen brightness adjustment as described herein. A flash memory 614 may be used to store, for example, programming or instructions for execution by the processor 612. Depending on the type of device, the mobile device 611 stores and runs an operating system through which specific applications may be run on the device. Examples of operating systems include Android, Apple iOS, Microsoft Windows OS, Bada, Tizen, Symbian OS, Blackberry OS, or the like. Flash memory 614 may also be used to store mobile configuration settings for different mobile applications or services executable at mobile device 611 (using processor 612). Mobile device 611 may also include a non-volatile random-access memory (RAM) 616 for a working data processing memory. The non-volatile RAM 616 or storage 637 may be coupled to the processor 612 and operable to store programming code executable by the 612 processor.

Alternatively, or in addition, applications may be stored in storage 637, which may be a solid-state memory storage or other memory device suitable for storing applications. In one example, the storage 637 may be a separate chip that includes tamperproof storage and execution memory and is operable to communicate with operating system. The storage 637 may, for example, store an instance of a sales notification application 647 for processing receipt data, communicating with one or more services or servers, and processes as described with reference to the examples of FIGS. 1-3. Other applications such as 642 may also be stored in storage 637. For example, the other applications 642 may include, for example, a banking application 644 that enables the mobile device 611 to execute electronic transactions (i.e., e-transactions). The banking application 644 may be operable to enable the mobile device 611 to conduct e-transactions or the like.

The logic implemented by the processor 612 of the mobile device 611 configures the processor 612 to control various functions as implemented by the mobile device 611. The logic for a processor may be implemented in a variety of ways, but in the presented examples, the processor logic is implemented by programming for execution by the processor 612.

Figure 7:
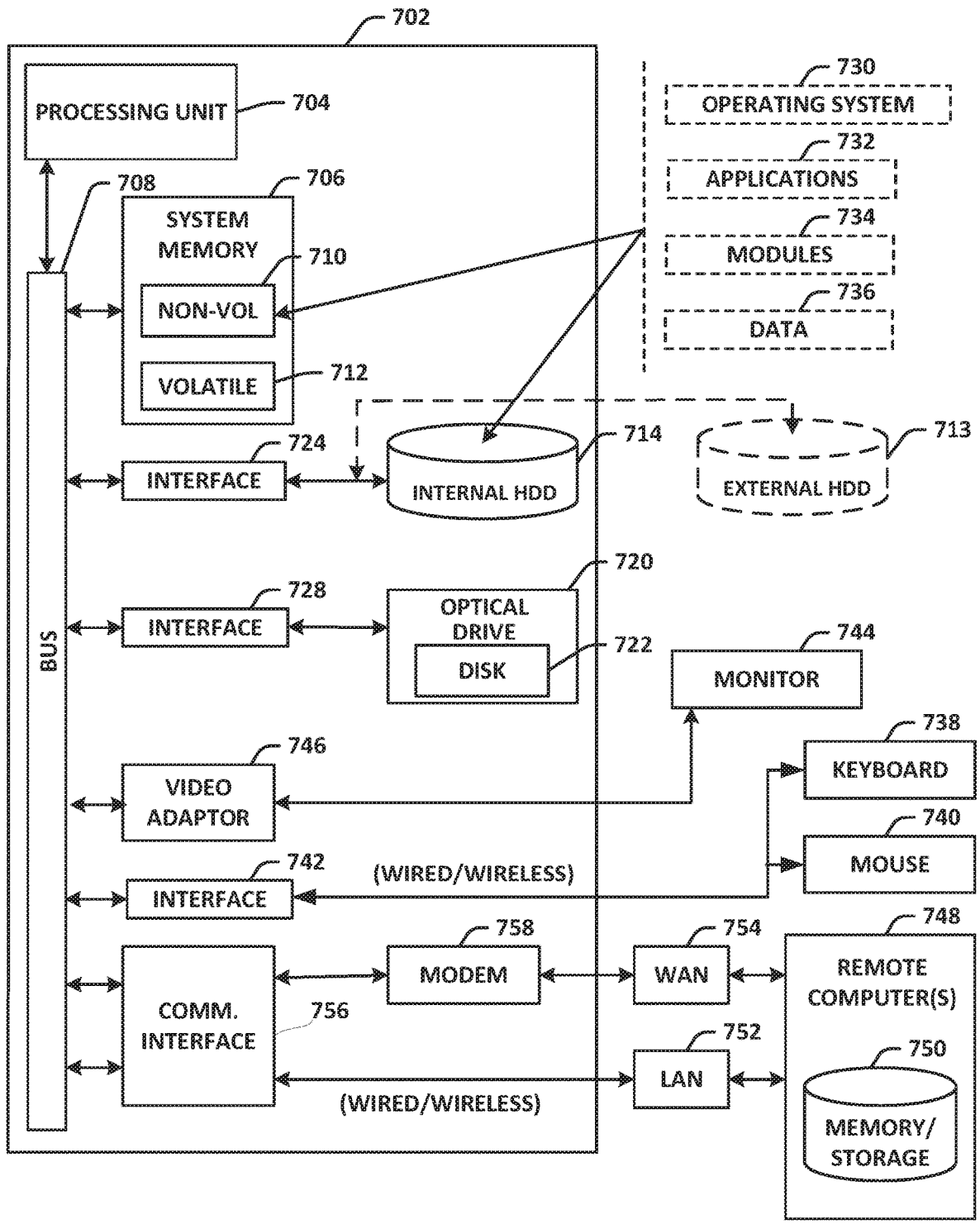
FIG. 7 illustrates an example of a computing architecture suitable for implementing components of the system examples and for providing the processes discussed in the process examples.

FIG. 7 illustrates an example of a computing architecture suitable for implementing various examples as previously described. In one example, the computing architecture 700 may include or be implemented as part of system 100 or 200.

As used in this application, the terms "system" and "component" are intended to refer to a computer-related entity, either hardware, a combination of hardware and software, software, or software in execution, examples of which are provided by the exemplary computing architecture 500 as well as the examples of FIGS. 1, 2, 4A, 4B and 6. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or a processor and the server or the processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 700.

As shown in FIG. 7, the computing architecture 700 includes a processing unit 704, a system memory 706 and a system bus 708. The processing unit 704 can be any of various commercially available processors. For example, merchant 121 or merchant 123, merchant point of sale device 23, server 45 and components thereof, may incorporate one or more of the components of the computing architecture 700, such as the processing unit 704, the system memory 706 and so on. Other components, such as the keyboard 738 and the mouse 740, may be omitted in some examples.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the example shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714 or 713, and an optical disk drive 720 to read from or write to a removable optical disk 722 (e.g., a CD-ROM or DVD). The HDD 714 and optical disk drive 720 can be connected to the system bus 708 by an HDD interface 724 and an optical drive interface 728, respectively. The HDD interface 724 for external drive implementations can include at least one or both of Universal Serial Bus (USB) and IEEE 1394 interface technologies. The drives and associated computer-readable media provide volatile and/or nonvolatile storage of data, data structures, computer-executable instructions, and so forth. For example, several program modules can be stored in the drives and memory units 710, 712, including an operating system 730, one or more application programs 732, other program modules 734, and program data 736. In one example, the one or more application programs 732, other program modules 734, and program data 736 can include, for example, the various applications and/or components of the computing architecture 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touchscreens (e.g., capacitive, resistive, etc.), trackballs, track pads, sensors, styluses, and the like. These and other input devices are often connected to the processing unit 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 may be connected to the LAN 752 through a wire and/or wireless communication interface 756. The communication interface 756 can facilitate wire and/or wireless communications to the LAN 752, which may also include a wireless access point disposed thereon for communicating with the wireless functionality of the communication interface 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown in FIG. 7 (as well as those of FIG. 1 FIG. 4A) are exemplary and other means of establishing a communications link between the computers can be used.

The computer 702 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; and the like.

Figure 8:
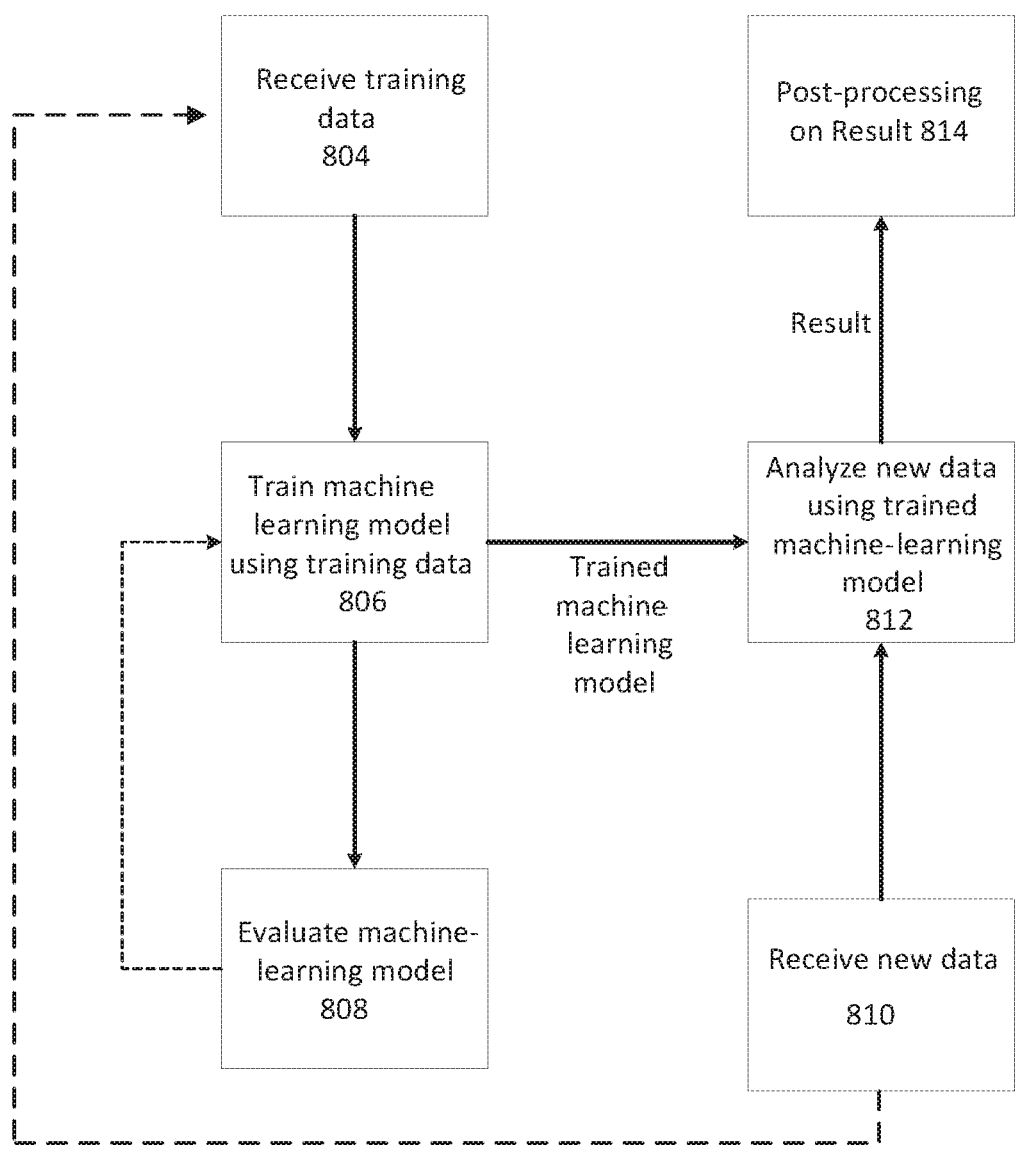
FIG. 8 is a flow chart of an example of a process for generating and using a machine-learning model according to some aspects.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. For example, the product information collected through receipts (electronic (e.g., emailed or messaged receipts) and images of paper receipts) may be used to train the machine learning component 160 of FIG. 1 and 43 of FIG. 2 to provide the product notifications described herein. Input data, such as that gathered from receipts input via a sales notification application and image recognition service or application, may be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to FIG. 8, which is a flowchart of an example of a process for training and using a machine-learning model according to some aspects of the foregoing examples.

The process 800 includes several steps, for example, in block 804, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In examples, the training data may include transaction information, product information, historical transaction information, market information, and/or information relating to the transaction. The transaction information may be for a general population and/or specific to a user and user account related to the best deal service.

In block 806, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 808, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current transaction information, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a task, the process can return to block 806, where the machine-learning model can be further trained using additional training data or otherwise modified to improve accuracy. If the machine-learning model has an adequate degree of accuracy for the task, the process can continue to block 810.

In block 810, new data is received. In some examples, the new data is received from a remote database or a local database, constructed from various subsets of data, or input by a user. The new data may be unknown to the machine-learning model. For example, the machine-learning model may not have previously processed or analyzed the new data. In some examples, the new data may be provided to the process at 804 for use as training data.

In block 812, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 814, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

As used in this application, the terms "system", "component," "module" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure, technique, process, or method is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations. Useful machines for performing operations of various examples include general purpose digital computers or similar devices.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various examples also relate to apparatus or systems for performing these operations. This apparatus may be specially constructed for the described purpose or it may comprise a general-purpose computer as selectively activated or reconfigured for operation by a computer program stored in the computer. The procedures or processes presented herein are not inherently related to a particular computer or other apparatus. Various general-purpose machines may be used with programs written in accordance with the teachings herein, or it may prove convenient to construct more specialized apparatus to perform the required method steps. The structure for a variety of these machines appears from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a memory;
   a processor;
   a touchscreen display operable to receive inputs and present a graphical user interface generated by the processor;
   a sales notification application including programming code stored in the memory, wherein the sales notification application when executed by the processor is operable to:
      establish a linkage to a payment account and a payment card associated with the payment account;
      send an image of a receipt of a product purchase transaction to an image recognition service;
      receive, from the image recognition service, recognized text of the image of the receipt;
      obtain, from the recognized text, a list of products included on the receipt of the product purchase transaction;
      present, in the graphical user interface presented on the touchscreen display, the list of products obtained from the recognized text from the image of the receipt of the product purchase transaction;
      receive, via an input to the graphical user interface presented on the touchscreen display, an indication of a product selected from the list of products presented in the graphical user interface;
      provide product information related to the selected product to a best deal service, wherein the product information includes a portion of the recognized text from the receipt related to a product price, a location of a sale of the selected product, a quantity of the product involved in the sale of the selected product;
      receive from the best deal service a product notification containing deal information based on a price paid by another participant of the best deal service related to the selected product, wherein the deal information contained in the product notification further includes an indication of the location of the sale of the selected product where a quantity discount is obtainable; and
      enable the payment card associated with the sales notification application executing on the processor for purchase of the selected product included in the received product notification.

2. The apparatus of claim 1, further comprising:
a transceiver coupled to a communication interface and operable to communicate with a payment account server, and
wherein the programming code of the sales notification application when executed by the processor is further operable, when establishing the linkage to the payment account and the payment card associated with the payment account, to:
send a message to the payment account server, wherein the message includes authentication information usable to authenticate that the apparatus is associated with the payment account and the payment card; and
receive via the communication interface an authentication message from the payment account server indicating the apparatus has been authenticated as being associated with the payment account and the payment card.

3. The apparatus of claim 1, wherein the programming code of the sales notification application is further operable, when executed by the processor, to:
select a user preference setting that product purchase transactions of the payment card are provided to the best deal service; and
select another user preference setting that enables products in the product purchase transactions of the payment card to be presented in the list of products obtained from the recognized text.

4. The apparatus of claim 1, wherein the programming code of the sales notification application is further operable, when executed by the processor, to:
obtain a product from a plurality of payment card-purchased products in product purchase transactions of the payment card for inclusion and presentation in the list of the products obtained from the recognized text; and
indicate to the best deal service as a user preference setting that the product information related to the products in the recognized text, and products obtained from the product purchase transactions of the payment card are to be evaluated with respect to the product information stored in a database.

5. The apparatus of claim 1, wherein the deal information contained in the product notification further includes an indication of:
a merchant name that has the selected product in stock and at a lower price than in the image of the receipt and a location relative to user-preferred locations where the selected product has a lower price than in the image of the receipt.

6. The apparatus of claim 1, wherein the sales notification application is further operable to:
present deal information on a map on the graphical user interface with indications of where the selected product is available to be purchased: at a lower individual price, at a quantity discount, as part of a combination sale, or as a seasonal sale.

7. A system comprising:
a server including:
one or more server processors;
a communication interface coupled to the server processor and operable to communicate with external devices; and
programming code operable when executed by the server processor to interact with a best deal service and an image recognition service; and
wherein any one or more of the one or more the server processors is operable to:
interact, via an application program interface (API) module of the communication interface, with a sales notification application of a mobile device to receive from the sales notification application, product information related to a selected product;
interact, via the API module, with the best deal service to forward the product information received from the sales notification application to the best deal service that is operable to obtain deal information based on the product information related to the selected product;
receive, via the API module, a product notification containing the deal information from the best deal service; and
interact, via the API module, with the sales notification application of the mobile device to provide the deal information to the sales notification application of the mobile device;
wherein the best deal service is operable to use the product information forwarded by the any one or more of the one or more server processors to perform further functions, including functions to:
recognize pricing-related patterns by applying a machine learning algorithm to the product information, wherein the product information includes respective price information, respective product identification information, respective product category information, respective merchant name information, respective merchant location information, and respective product quantity information;
identify a pricing-related pattern recognized by the machine learning algorithm from the recognized pricing-related patterns that correspond to the selected product; and
process the pricing-related pattern identified by the machine learning algorithm to obtain the deal information.

8. The system of claim 7, wherein the any one or more of the one or more server processors are further operable to:
receive, via the communication interface from the sales notification application, a product notification request including an image of a purchase receipt;
forward the product notification request to the image recognition service that is operable to recognize text in the image of the purchase receipt;
receive a recognition result from the image recognition service;
provide the recognition result to the best deal service that is operable to parse the recognition result;
receive a list of products obtained from the recognition result; and
forward the list of products to the sales notification application.

9. The system of claim 8, wherein:
the best deal service is accessible by the any one or more of the one or more server processors, and
the best deal service when provided with the recognition result is operable to:
parse the recognized text in the recognition result, for each product in the receipt, at least one of a price information, a product identification information, a product category information, a merchant name information, a purchase location information, and a product quantity information; and
provide the at least one of the price information, the product identification information, the product category information, the merchant name information, the purchase location information, or the product quantity information parsed from the recognized text to the sales notification application executing on the mobile device for use in generating the list of products.

10. The system of claim 7, wherein the any one or more of the one or more server processors are further operable to perform functions, including functions to:
receive product information from a plurality of instances of sales notification applications respectively operating on a plurality of other mobile devices;
obtain transactions associated with a payment account, wherein each transaction of the obtained transactions includes product information;
obtain product information from each transaction;
use product information obtained from each transaction and product information obtained from the plurality of instances of sales notification applications in a comparison of where the selected product is available at a lower price; and
provide a result of the comparison to a product notification component.

11. The system of claim 7, further comprising:
a plurality of product notification participant mobile devices, wherein each mobile device of the plurality of the product notification participant mobile devices, includes:
an instance of the sales notification application operable to be executed on a processor of each respective mobile device, and the instance of the sales notification application when executed by the processor of each respective mobile device is operable to perform further functions, including functions to:
upload receipt images for aggregation by the best deal service, wherein the receipt images contain image data;
wherein the best deal service is operable to:
receive the uploaded receipt images from each instance of the sales notification application;
obtain recognized text in the uploaded receipt images received from each instance of the sales notification application; and
utilize the recognized text in a comparison when determining the deal information in response to the selected product.

12. The system of claim 11, wherein the best deal service is operable to perform further functions, including functions to:
upon receiving the uploaded receipt images from participant mobile devices, recognize one or more of price information, product identification information, product category information, merchant name information, merchant location information, and product quantity information in the recognized text by applying an image recognition algorithm operable to recognize text in the image data; and
in response to the comparison, forward a portion of the recognized one or more of the price information, the product identification information, the product category information, the merchant name information, the merchant location information, and the product quantity information that corresponds to the selected product to the server for forwarding to the sales notification application.

13. The system of claim 7, wherein the system comprises the mobile device including:

a transceiver operable to wirelessly communicate with external devices including the communication interface;
a processor;
a display device controlled by the processor;
a memory; and
the sales notification application including programming code stored in the memory, wherein the sales notification application when executed by the processor is operable to:
obtain an image of a receipt of a product purchase transaction;
receive recognized text of the image of the receipt from the image recognition service;
obtain a list of products including the product information from the received recognized text;
present, in a graphical user interface of the mobile device, the list of the products including the product information;
receive, via the graphical user interface, an indication of the selected product from the list of products presented in the graphical user interface;
provide the product information related to the selected product to the best deal service, wherein the product information related to the selected product includes a portion of the recognized text from the receipt related to a price of the selected product, a location of a sale of the selected product, and a quantity of the selected product involved in the sale of the selected product;
receive, from the best deal service, a product notification containing deal information related to the selection of the selected product, wherein the deal information includes an indication of a lower price than in the image of the receipt; and
enable a payment card associated with the sales notification application executing on the mobile device for purchase of selected product based on the deal information included in the product notification.

14. A method comprising:
establishing a linkage to a payment account and a payment card associated with the payment account;
sending an image of a receipt of a product purchase transaction to an image recognition service;
receiving, from the image recognition service, recognized text of the image of the receipt;
obtaining, from the recognized text, a list of products included on the receipt of the product purchase transaction;
presenting, in a graphical user interface presented on a touchscreen display, the list of products obtained from the recognized text from the image of the receipt of the product purchase transaction;
receiving, via an input to the graphical user interface presented on the touchscreen display, an indication of a product selected from the list of products presented in the graphical user interface;
providing product information related to the selected product to a best deal service, wherein the product information includes a portion of the recognized text from the receipt related to a product price, a location of a sale of the selected product, a quantity of the product involved in the sale of the selected product;
receiving from the best deal service a product notification containing deal information based on a price paid by another participant of the best deal service related to the selected product, wherein the deal information contained in the product notification further includes an indication of the location of the sale of the selected product where a quantity discount is obtainable; and enabling the payment card associated with a sales notification application executing on a processor for purchase of the selected product included in the received product notification.

15. The method of claim 14, further comprising:

sending a message to a payment account server, wherein the message includes authentication information usable to authenticate that an apparatus is associated with the payment account and the payment card; and receiving via a communication interface an authentication message from the payment account server indicating the apparatus has been authenticated as being associated with the payment account and the payment card.

16. The method of claim 14, further comprising:

selecting a user preference setting that product purchase transactions of the payment card are provided to the best deal service; and selecting another user preference setting that enables products in the product purchase transactions of the payment card to be presented in the list of products obtained from the recognized text.

17. The method of claim 14, further comprising:

obtaining a product from a plurality of payment card-purchased products in product purchase transactions of the payment card for inclusion and presentation in the list of the products obtained from the recognized text; and indicating to the best deal service as a user preference setting that the product information related to the products in the recognized text, and products obtained from the product purchase transactions of the payment card are to be evaluated with respect to the product information stored in a database.

18. The method of claim 14, wherein the deal information contained in the product notification further includes an indication of:

a merchant name that has the selected product in stock and at a lower price than in the image of the receipt and a location relative to user-preferred locations where the selected product has a lower price than in the image of the receipt.

19. The method of claim 14, further comprising:

presenting the deal information on a map on the graphical user interface with indications of where the selected product is available to be purchased: at a lower individual price, at a quantity discount, as part of a combination sale, or as a seasonal sale.

\* \* \* \* \*